United States Patent
Shew et al.

(10) Patent No.: US 10,057,135 B2
(45) Date of Patent: Aug. 21, 2018

(54) UNIFIED MANAGEMENT OF COMPUTING NETWORKS

(71) Applicant: Ciena Corporation, Hanover, MD (US)

(72) Inventors: Stephen Shew, Ottawa (CA); Nigel Davis, Edgware Middx (GB)

(73) Assignee: Ciena Corporation, Hanover, MD (US)

( * ) Notice: Subject to any disclaimer, the term of this patent is extended or adjusted under 35 U.S.C. 154(b) by 269 days.

(21) Appl. No.: 14/556,538

(22) Filed: Dec. 1, 2014

(65) Prior Publication Data

US 2015/0156059 A1  Jun. 4, 2015

Related U.S. Application Data

(60) Provisional application No. 61/910,503, filed on Dec. 2, 2013.

(51) Int. Cl.
*G06F 15/173* (2006.01)
*H04L 12/24* (2006.01)

(52) U.S. Cl.
CPC ................................. *H04L 41/145* (2013.01)

(58) Field of Classification Search
CPC .................................................... H04L 41/145
See application file for complete search history.

(56) References Cited

U.S. PATENT DOCUMENTS

| | | | | |
|---|---|---|---|---|
| 5,978,567 A | * | 11/1999 | Rebane | H04L 29/06 348/E5.008 |
| 2003/0217133 A1 | * | 11/2003 | Ostrup | H04L 41/0869 709/223 |
| 2015/0074259 A1 | * | 3/2015 | Ansari | H04L 67/02 709/224 |

OTHER PUBLICATIONS

Manilos Kamvysselis, "Universal Turing Machine", 2008, MIT, p. 1-2.*

* cited by examiner

*Primary Examiner* — Ryan Jakovac
(74) *Attorney, Agent, or Firm* — Clements Bernard Walker PLLC; Chirstopher L. Bernard; Lawrence A. Baratta, Jr.

(57) ABSTRACT

Methods and systems for managing a computing network. At least a portion of the computing network is represented as a recursive architecture of elements representing bit transport, bit transformation and bit storage actions of the network. A respective set of one or more elements are associated with at least one system implementing functions of the portion of the computing network. The recursive architecture of elements is subsequently used to manage the at least one system implementing functions of the portion of the computing network.

16 Claims, 10 Drawing Sheets

UNIFIED MANAGEMENT OF COMPUTING NETWORKS

CROSS-REFERENCE TO RELATED APPLICATIONS

This application is based on, and claims benefit of, U.S. Provisional Patent Application No. 61/910,503 filed on Dec. 2, 2013, the entire content of which is incorporated herein by reference.

FIELD OF THE INVENTION

The present application relates generally to management systems for computing networks, and more specifically to unified management of computing networks.

BACKGROUND

A "Computing Network" refers to any system that includes one or more computers and storage devices interconnected by a communications network that enables the implementation of software applications that utilize the functionality of all three elements (computation, storage, and information transfer) of the system. The modern Internet is an example of a computing network, which enables the implementation of so-called Cloud computing applications that utilize the capabilities of the computation, storage, and information transfer elements that form the Internet. A data center is also an example of a computing network as the three elements are present, but in different proportions, than the Internet. Communications networks primarily perform information transfer.

At present, the methods, techniques and systems used to implement each of the three elements of a computing network are modeled using respective different architectures, and managed using respective different techniques, representations and protocols.

For example, in communications networks, the client/server and recursive nature of the architecture identified in International Telecommunications Union (ITU) Recommendation G.800 are used in the TeleManagement Forum's (TMF's) Multi-Technology Network Management specifications to manage communication networks. New networking technologies such as Optical Transport Network (OTN) can be added into the TMF's management solutions without major change because the commonality of the new technology with other networking technologies is readily understood using the patterns exposed through the G.800 architecture. These techniques have been designed for managing communications networks, and were not developed for managing computing and storage systems.

In computer programming languages, object oriented concepts reflect some of the power of information models in that abstract classes define some structure and methods that specific instances of the object class can inherit. This enables programmers familiar with one class instance to readily understand and use another class that inherits from a common object or abstract class. The object concept is seen in the Distributed Management Task Force (DMTF) Common Information Model (CIM) which has been instantiated into system specific specifications such as the "Wi-Fi Port Profile", "Physical Computer System View Profile", "Open Virtualization Format Specification", and "System Management Architecture for Server Hardware" (in DSP0217), all of which may be used to manage computer server systems.

The Storage Networking Industry Association (SNIA) has defined techniques for modeling and management of storage devices in a network. However, these techniques do not offer any means of managing the communications networks that interconnect storage devices with each other and with associated computing resources.

It would be desirable to provide a unified architecture capable of efficiently modeling all three elements of a computing network.

Similarly, it would be desirable to provide a unified management system capable of efficiently managing a computing network of any desired size or complexity.

The problem then, is how to model the functionality of communications networks, computer servers and storage systems in a unified manner, so that unified hierarchical management techniques may be implemented in a computing network.

SUMMARY

An aspect of the present invention provides techniques in which a computing network is represented as a recursive structure of Universal Turing Machines (UTMs), files, and communication networks. Within this structure, UTMs and files are sources and sinks of information, while communication networks transfer information. Associating UTMs and networks of UTMs with computing, communication, and storage resources, and recursing the resulting pattern, enables unified management of both the hardware and functionality of cloud computing applications using a single management system.

Thus an aspect of the present invention provides methods and systems for managing a computing network. At least a portion of the computing network is represented as a recursive architecture of elements representing bit transport, bit transformation and bit storage actions of the network. A respective set of one or more elements are associated with at least one system implementing functions of the portion of the computing network. The recursive architecture of elements is subsequently used to manage the at least one system implementing functions of the portion of the computing network.

In some embodiments, the ITU-T Recommendation G.800 model of networking is extended to incorporate UTM models of computing resources and files as models of storage.

In some embodiments, management systems known in the art are extended using the present techniques to encompass computing network functionality beyond their conventional domain.

Information models are often used to capture the essence of a problem space so as to guide/constrain the structure of data represented in detailed management applications. The value of information models lies in the simplification it brings to the problem space in that a like things are identified and dealt with in the same way reducing the variety of types of things to manage, a pattern or re-occurrence that reduces the need for many specific applications, and a structure that enables minimal changes to accommodate new variants of a thing being managed. In networking, the client/server and recursive nature of G.800 are used in the TeleManagement Forum's Multi-Technology Network Management specifications to manage networks. New networking technologies such as OTN can be added into the TMF's management solutions without major change because the commonality with other networking technologies is readily understood using the G.800 architecture.

In programming languages, object oriented concepts reflect some of the power of information models in that abstract classes define some structure and methods that specific instances of the object class can inherit. This enables programmers familiar with one class instance to readily understand and use another class that inherits from a common object or abstract class. The object concept is seen in the DMTF CIM model which has been instantiated into system specific specifications such as the "Wi-Fi Port Profile", "Physical Computer System View Profile", "Open Virtualization Format Specification", and "System Management Architecture for Server Hardware". G.800 extensions (UTM and storage) could also be applied to the DMTF model by adding recursion to its storage, compute, and networking profiles. Using the G.800 extensions is advantageous as it identifies the patterns for the models of the resources covered by DMTF which can then be identified in the DMTF objects. Where DMTF objects refer to network ports, linkage could be made to TMF management solutions, particularly at the TMF Physical Termination Point (PTP) construct and any future derivative of that construct such as the new TMF Termination Point Encapsulation (TPE), TMF Termination Construct (TC) and Open Networking Foundation (ONF) LTP.

Similarly, the storage model of SNIA could be enhanced with recursion so that relationships between types of storage is defined. For networked storage, the linkage to the TMF's management solutions could be made from the SNIA model where communication between storage devices occurs.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
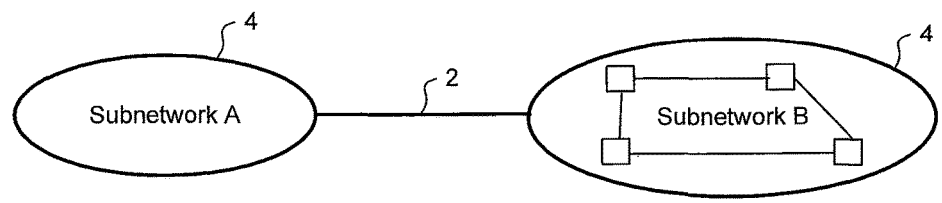
FIG. 1 is a block diagram schematically illustrating sub-networks and links known from ITU-T Rec. G.800.

Networking, in a broad sense, is about moving information between parties. The understanding of networking has developed through history as the nature of the parties (people, machines), the information types (written text, voice, data, etc.), and media (paper, signals etc.), have changed. Information theory and information models have been critical to developing and deploying networking technology because they permit complex technologies to be comprehended in terms of a smaller set of fundamental constructs, one of which is the notion of the bit itself.

As the number of computers of all forms increases, so too does the amount of computer to computer communication. The term "computer network" reflects this activity. Similarly the increasing communication between storage devices is reflected in the term "storage networking". The present technique expands the context of networking by defining its relationship to computing and storage. The approach taken is to view networking, computing, and storage as trinitarian actions on the bit. All systems that involve information use these three fundamental actions on a bit in varying proportions.

Transport network architecture Recommendations in Q12 of ITU-T SG15 have developed from specific and generic technologies. For example, ITU-T Recommendation G.805 was generalized from G.803 (Synchronous Digital Hierarchy). Extensions for connectionless networks followed in G.809, and then G.800 unified both connection-oriented and connectionless networks. In the direction of specific technologies, architecture for Ethernet (G.8010) and MPLS (G.8110) were described with the newer architectural constructs. Functional architecture in general is developed "bottom up" by looking at specific technologies, and "top down" by creating generalizations. Going between these two poles allows general models to be tested against specific technologies.

One of the main uses of network architectural descriptions is the development of information models for management of communication networks and their components. An example is ITU-T Recommendation G.798 for Optical Transport Network (OTN) equipment. Another example is the use of the G.805 model in TeleManagement Forum (TMF) specification TMF814, which makes use of the recursive layering constructs (defined in G.805) at the various termination points (for example, Physical Termination Point (PTP)). This is used in the TeleManagement Forum's Multi-Technology Network Management specifications that are applied to management of telecommunication networks. Recently TMF has also taken advantage of the further generalization exposed by ITU-T G.800 in development of a converged network model providing a compact and unified view of networking from a management/control perspective.

Modern communications networks are increasingly devoted to computer-to-computer interactions. Many applications run in data centres to support access to huge amounts of data. It is practical and valuable to have a high concentration of computing and storage in data centres because users can access information and resources in those centres over networks.

Cloud computing is the discipline that has emerged to advance these large systems in data centers, and many aspects of cloud computing are being addressed in many standards bodies. The combination of networking, computing, and storage is complex, and different architectures have been proposed for cloud computing. These models tend to reflect either a business view (e.g., cloud consumer, cloud provider), or a functional view where activities from cloud instances are grouped (e.g., user layer, access layer, services layer, resource layer etc.). None of these models appears to provide a more succinct architecture that unifies networking, computing, and storage. The present technique addresses this limitation by building on a generalization of these three elements, which is done by describing networking, computing, and storage in terms of three actions that can be performed on the bit, namely: transformation, transport, and storage.

Bit "Transformation", refers to any process in which one or more bits is changed from one state to another. An example of bit transformation is a software process that manipulates input data and alters it in some way. For example, a text editor can be used to change text information in a file, and in so doing performs a bit "transformation" operation on at least some of the data in that file. Encryption and encoding processes also perform bit transformation functions, typically across an entire file, rather than just parts of the file.

Bit "Transport" refers to any process by which one or more bits of information are conveyed from one party to another specifically without change. An example of bit transport is the operation of a network to convey data between devices and/or users. However, a postal service can also be considered as providing a bit transport function, albeit much slower than modern communications networks.

Bit "Storage" refers to any process by which one or more bits are written to some form of physical media that "fixes" at least their state for later retrieval. Examples of bit storage include (without limitation) information printed on a physical medium such as paper, and information recorded in an optical or magnetic layer of a disc or tape storage medium.

These three actions may be referred to as "Trinitarian" actions on a bit. In the following description, the relationship between these three actions, and systems that exist in the networking, storage, and computing industries is discussed.

Systems of Composite Actions

In the modern networking industry, there are many types of products that contribute to the services, management, and delivery (dataplane) of bit transfer functionality. In the dataplane, examples include: switches, routers, and Optical Add-Drop Multiplexers (OADMs). Wireless examples include base stations and WiFi nodes. The transfer of information is the primary function of networking systems. However, computer hardware and software are often used to perform actual movement of bits (e.g., transmitters, cross connects, and packet forwarders) so it is clear that at least some bit transformation (i.e., computing) is also frequently involved although the end result is that the bits provided at the input are moved unchanged (other than in time) to the output. Computing is needed for functions such as adapting information from one form into another, matching fields in forwarding operations, monitoring Operations Administration and Maintenance (OAM), and maintaining forwarding tables. Storage is a small but critical part of networking systems.

Storage systems have as their primary function the storage of bits. These systems do require some networking, especially for transferring bits to and from a storage device. In cloud storage services, considerable distances can exist between a source of bits and a storage system on which it is to be stored, and therefore significant bit transport functionality will also be involved. Computing (bit transformation) in storage systems is present for control and management and can be involved in actions, such as transforming information between different storage formats, encryption, and compression.

For computing systems, bit transformation is the predominant function in the system. However, storage is more than just a minor part of the system since software (especially operating systems) occupies an increasing amount of space. Within computing systems, a great deal of bit transfer occurs, not just to and from I/O ports, but increasingly between processors (for example in multicore processors and compute clusters).

Table 1 summarizes the relative amounts of each operation on a bit for each of the three elements mentioned above. Although there is much variation within each of the three systems, we suggest that the relative amount of storage and networking actions needed in computing systems is generally greater than the amount of non-major actions that occur in storage and networking systems. This suggests that computing systems have the greatest complexity among the three types of systems.

TABLE 1

| | Operations on a bit | | |
|---|---|---|---|
| System type | Storage | Transfer | Transformation |
| Storage | Major | Minor (e.g., read/write) | Minor (e.g., compression) |
| Networking | Minor (e.g. queues) | Major | Important (e.g., layer adaptation) |
| Computing | Important (e.g., code storage) | Important (e.g., fetching code and data, device level I/O, data bus) | Major |

Considering networking, computing, and storage systems as compositions of bit transfer/transform/storage operations is a useful generalization that aids understanding of the differences and similarities within and between networking, computing, and storage systems. All of these systems are related to information, but differ in the proportions of the three fundamental bit operations present. This viewpoint, trinitarian operations on the bit, enables a more fluid understanding of emerging technologies as instances of the three trinitarian operations. For example, going from a single PC board to an Advanced Telecommunications Computing Architecture (ATCA) shelf of processor cards, then to a data center can be viewed as variations on the proportions and amounts of the three bit operations.

Network Architecture

The unified functional architecture of transport networks as described in ITU-T Recommendation G.800 is an architecture that can describe many types of networks including connectionless and connection-oriented technology. It is assumed that readers have some familiarity with ITU-T Rec. G.800 and this section will review its main concepts at a (necessarily) simplified level.

ITU-T Rec. G.800 describes networks using topological and functional constructs. For topology, G.800 uses links and subnetworks as illustrated in FIG. 1. A link 2 is a relationship between two points (or addresses) between which information can be transferred. A subnetwork 4 is a relationship between a set of (at least two) points (or addresses) within which information can be transferred. Thus, FIG. 1 illustrates two subnetworks 4 interconnected by a link 2. Each subnetwork 4 may be composed of two or more points (or addresses). An important property is that a subnetwork 4 can be decomposed into smaller subnetworks connected by links. That is, the subnetwork model can recurse in size. The lower limit of this recursion is an individual switch matrix. Theoretically, there is no upper limit to the recursion of subnetworks, although the entire network defines a practical upper limit.

In ITU-T Rec. G.800, a "layer" is a topological component that represents all of the "access groups of the same type which may be associated for the purpose of transferring information". The concept of layers can be applied to both a network and to individual components (or nodes) within that network. In both cases, an instance of a layer is capable of transferring only one type of information, which is known as "characteristic information" (CI) of that layer. In general terms, CI is "a signal with a specific defined format". A broad principle is that a layer can only transport a single, specified signal type or format—which is the characteristic information of that layer. A layer of a network can be decomposed topologically into subnetworks and links, all of which are configured to transport only the CI of that layer. For example, an Ethernet layer can be topologically decomposed into subnetworks and links, all of which transport only Ethernet packets.

Figure 2A:
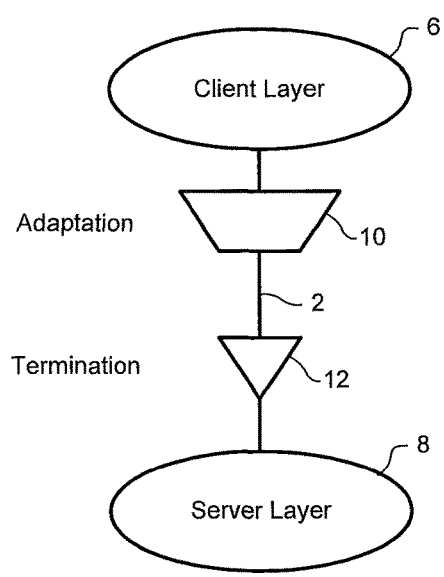
FIGS. 2A and 2B schematically illustrate adaptation and termination functions known from ITU-T Rec. G.800.
Figure 2B:
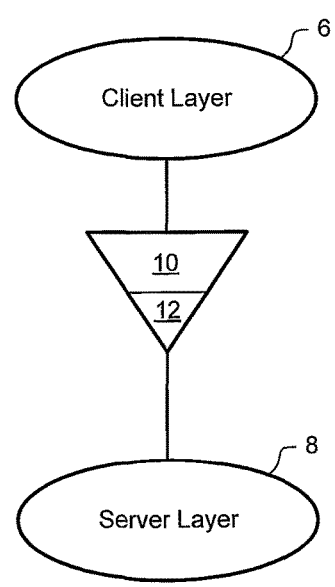

Functions in ITU-T Rec. G.800 include transport entities which perform the transfer of characteristic information within a layer, and adaptation entities which perform the transfer of information between layers. FIGS. 2A and 2B illustrate adaptation entities connected via respective links between a pair or layers, which are referred to as a client layer 6 and a server layer 8, Transport entities (not shown in FIGS. 1 and 2) are associated with subnetworks 4 and links 2 of a given layer, as the function that transfers characteristic information of that layer between points or addresses in a link or subnetwork. Adaptation entities operate by transforming characteristic information of one layer into characteristic information of another layer. Adaptation entities may be divided into adaptation functions 10 and termination functions 12. Adaptation functions 10 operate by transforming characteristic information of one layer into adapted information, which may be used by a termination function 12 to generate respective characteristic information of the other layer. An example of an adaptation function 12 is the Generic Framing Procedure of ITU-T Rec. G.7041 that can be used to transform Ethernet frames into Optical Data Unit (ODU) payloads in the OTN. A termination function 12 operates by adding layer-specific information to received information to create characteristic information of the server layer. For example, a termination function of a SONET/SDH layer may operate by encapsulating received information (such as IP packets or Ethernet frames, for example) within STM-n frames for transport through the SONET/SDH layer.

Adaptation entities 10 and termination entities 12 are commonly found together. FIG. 2 illustrates symbols customarily used for these functions. In FIG. 2A, respective symbols for Adaptation and Termination entities are illustrated separately and connected by an intrafunction link 2. In cases wherein the adaptation and termination entities 10, 12 are implemented together, it is customary to combine the two symbols as shown in FIG. 2B. In both of FIGS. 2A and 2B, the adaptation and termination functions are connected to respective different layers 6, 8, which may be referred to as a server layer and a client layer. Typically, the server layer is so-named because it provides transport or other services to the client layer.

It will be seen that this architecture can recurse in two dimensions without any theoretical limit: both within a layer (via subnetworks and links), and between layers (via adaptation and termination functions). This enables the implementation of a unified model architecture that can represent any desired number of networking technologies that are sequenced in a client/server relationship. In contrast, models with a fixed number of defined layers are generally limited to specific technologies, and so are less capable.

As noted above, in networking systems the action of transforming bits (computing) has a role. This is noted in the adaptation and termination functions, but is also implicit in transport entities. A transport entity transfers information between input ports and output ports and is controlled by forwarding rules. For example, in destination address based forwarding, selection of the egress port involves a computing function. Many forms of channel forwarding require computing functions, for example when CI is multicast. This leads to the observation that at some level of subnetwork recursion, an equivalence exists between a subnetwork and a computing machine. This is discussed in more detail below.

Storage Architecture

Figure 3:
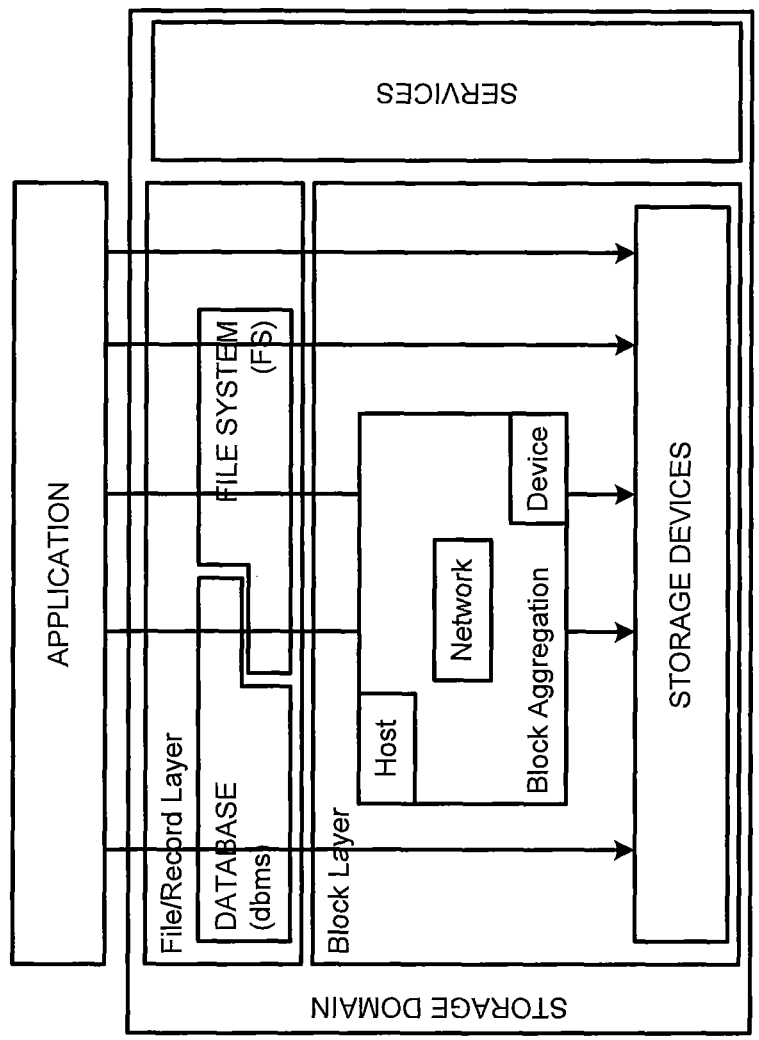
FIG. 3 is a block diagram of a storage network model known from the Storage Networking Industry Association (SNIA) Shared Storage Model.

Digital storage systems come in multiple forms. For example, Dynamic Random Access Memory (DRAM), Solid State Disc (SSD), hard drives, and tape, among others. All of these have a close relationship with computing elements and have an increasingly complex networking aspect. An instructive example of a model is the Storage Networking Industry Association's (SNIA) Shared Storage Model, which is illustrated in FIG. 3:

In the SNIA storage model, computing and networking are implicit in the system. The model accommodates scenarios where storage is in close physical proximity to computing elements (e.g., within a single machine such as a personal computer), as well as scenarios where storage is located far from users of the stored data (e.g., network attached storage). However, since this storage model defines a fixed number of layers, it does not recurse, and so will tend to become increasingly cumbersome as the size and complexity of the storage system increases. At the other end of the scale, it is not clear how well this model applies to a system in which computing and storage are incorporated into a single circuit board, for example.

In accordance with the present technique, storage systems are modeled using principles and concepts similar to those discussed above with reference to ITU-T Rec. G.800. These are topology, function, recursion, and the notion of characteristic information (CI).

In accordance with the present disclosure, a "file" is defined to mean a defined set of information (or bits) that is neither being transferred (networking) nor transformed (computing). A file is analogous to an "open sequence file" in ITU-T Rec. G.800, but in this case it is static. An important observation is that what defines the information in a file is the existence of something that is able to use it. For example, a file of ASCII characters may be recognised to be text by an entity that can recognise and process the English language, or a computer file may be understood to be a PowerPoint® file because it can be used by the PowerPoint® program.

For the purposes of the present disclosure, an "application" may be defined as a computing entity that performs a defined function and that can use a defined file type (i.e., a type (or format) of information). It is possible that a file may be used by more than one application. For example, an html file may be used (e.g., read and processed) by both a text editor application and an interpreter application. Using this definition, the above observation can be restated as: what defines the information in a file is the existence of an application that is able to use it.

The notion of an application being essential to the meaning of information also applies to CI in a networking environment. This is implied in ITU-T Rec. G.800 and its predecessors. For example, when referring to the VC-4 layer, it is implicit that the particular format of data within that layer is known to access points within that layer, so that information in that format can be transmitted and received. In this respect, CI comprises both data and (implicitly) the format of that data which enables transport entities to recognise and process the CI. Thus in the same way that the term CI is used in ITU-T Rec. G.800 to mean a specific type or format of information that can be transferred within a given layer, the term CI can also apply to files, which are a specific type or format of information that can be used by an application. Interestingly, ITU-T Rec. G.800 does not indicate the entity at the edge of a layer which operates as the source or sink of CI. In the present technique, an application is the source or sink entity for CI in the form of both open sequence files being transported through a layer network and files being used in a computing system. It may also be observed that the computing system terms 'read' and 'write' have a strong relationship to the communication networking terms 'source' and 'sink', respectively.

Figure 4B:
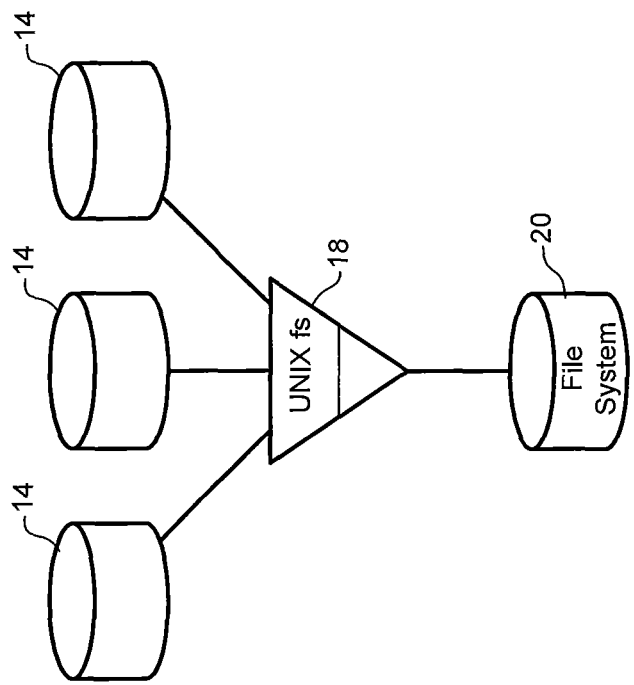
FIGS. 4A and 4B schematically illustrate adaptation and termination functions applied to storage in accordance with the present technique.
Figure 4A:
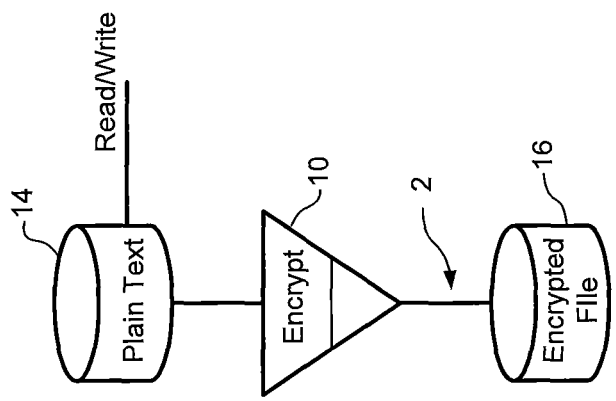

For notation purposes, the topological element of a file may be used to represent CI that is stored. This notation enables extension of ITU-T Rec G.800 to include an element that holds (stores) information rather than transferring or transforming it. The ITU-T Rec. G.800 symbols for adaptation and termination may then be used for adapting one file type (CI) to another. This basic nomenclature is shown in FIGS. 4A and 4B. FIG. 4A illustrates an example in which the adaptation function 10 encrypts the content of the plain text file 14, while the termination function encapsulates the encrypted data with a header and an end-of-file flag that enables the encrypted file 16 to be used (e.g., by another application).

As may be appreciated, file adaptation can recurse in a manner directly analogous to CI adaptation in ITU-T Rec. G.800, and following the same client-server relationships. For example, in FIG. 4A, the encrypted file 16 is a "server" for the pain text "client" file 14. Similarly, the encrypted file may be a client to a further server file (such as, for example, a compressed file, not shown). As in ITU-T Rec. G.800, the client-server relationship may recurs indefinitely with (at least theoretically) no upper limit. Near the lowest level of recursion there may be an adaptation to the CI of a file system that has records or blocks as shown in the high level architecture of FIG. 3. Other common file adaptations are redundancy (e.g., a client file is replicated in a server layer) and virtual file systems where a server layer is shared by multiple client virtual file system instances. The act of writing a file to a file system involves the adaptation of the file into the CI of that file system.

The nomenclature of "layers" known from ITU-T Rec. G.800 may also be applied to this architecture of file CI. In this case, both files (CI) and the applications that use them occupy the same "application layer", in a manner directly analogous to networking layers, which are occupied by networking entities and the CI they are designed to transport. The difference with application layers is that the application CI (i.e., files) is explicitly represented, whereas in networking layers, CI is implicit. The explicit representation of files in application layers is beneficial in that it enables the modeling of storage systems.

To depict the transfer of information to/from a stored file, link and subnetwork constructs known from ITU-T Rec.G.800 may be used. In the example of FIG. 4A, a single link 2 between each file and the adaptation and termination function is shown. However, it will be appreciated that one or more ITU-T Rec. G.800 subnetworks and links may be connected between the adaptation and termination functions and either or both of the two file layers. The networking aspect in storage systems is important, as storage networks (or storage area networks) and cloud storage are examples where there is frequently a significant distance (either geographically of topologically, or both) between where the application is executing and where the information it is using is physically stored.

Recursion within the same application/file layer, like subnetwork recursion in the same layer, may be represented by files within files. This representation is analogous to aggregation of information flows and subnetwork recursion in ITU-T Rec. G.800. It could also be represented as a group of files in a manner directly analogous to the ITU-T Rec. G.800 representation of an access group as a group of access points. As may be appreciated, applications, and the files (CI) they use necessarily occupy the same layer. It is therefore possible to refer to application layers and file layers, with the understanding that these terms actually refer to the same thing.

Recursion between types of files may be handled in a manner directly analogous to recursion between network layers in ITU-T Rec. G.800. For a file system, the CI comprises the structure of the information recorded on the specific storage devices. Individual files with CI for specific different applications are in respective client layers that are adapted to the file system by appropriate adaptation functions. This operation is illustrated in FIG. 4B, where a UNIX file system adaptation function 18 operates to adapt three different files 14 into the CI of a server layer file system 20.

Figure 5:
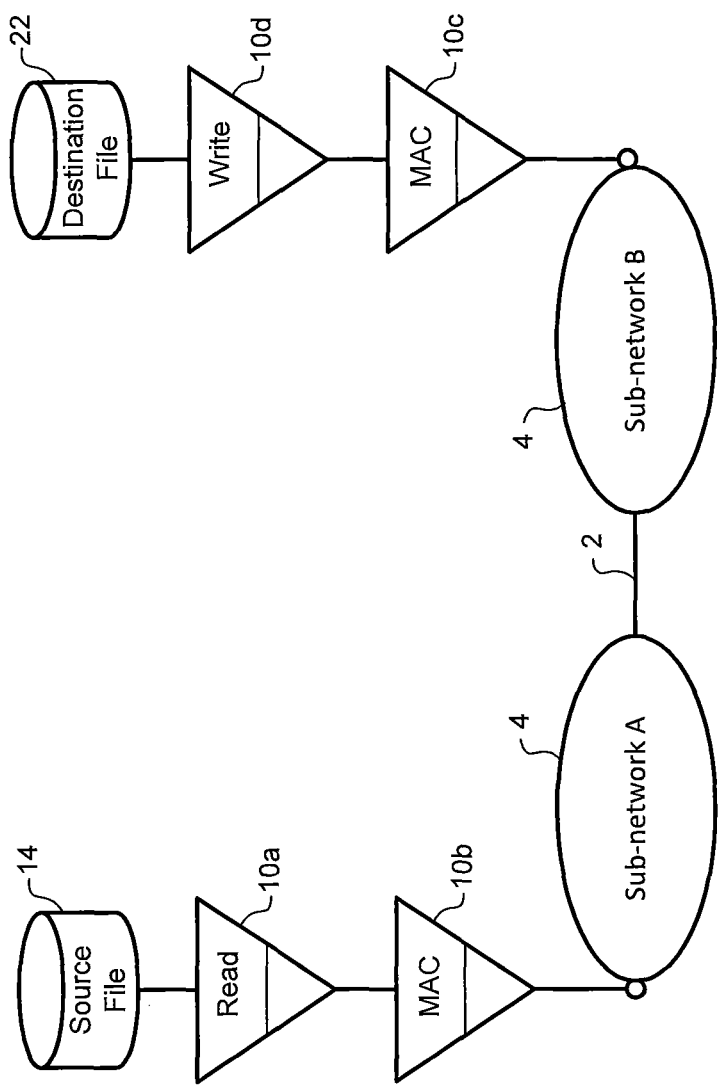
FIG. 5 schematically illustrates file transport through a network in accordance with the present technique.

FIG. 5 illustrates a representative model of file transfer across a network. The content of a source file is read (at 10*a*) and adapted (at 10*b*) by an adaptation function into network CI (e.g., Ethernet MAC frames) that can traverse a network (in this case, modeled as two subnetworks 4 connected by a link 2). At an egress of the network, the network CI adapted (at 10*c*) into the application CI of a destination file layer (e.g., by removing the MAC frame header) and writen (at 10*d*) to the destination file 22. The source and destination files may ocupy the same or different application layers (i.e., be usable by the same or different applications) as desired. Another view of the model of FIG. 5 is that static information (represented by the source file 14) is adapted into moving information (network CI) and then adapted back to static information (represented by the destination file 22).

Computing Architecture

As described above, computing systems have a high level of complexity due to the amount of networking and storage that is associated with the computing function. A number of models of computing exist, all of which strongly reflect existing computer architectures. The DMTF Computer System Profile (CSP) is a good example of an information model for a computer system. Extensions for virtualization of various components (e.g., memory, processor, file, etc.) are in other DMTF documents. The Computer System Profile is an application of the more general DMTF Common Information Model (CIM) which has been applied to storage, computing, and networking It is a considerably unifying model of existing systems but the model does not expose the abstracted relationships between networking, computing, and storage. While it is an important model, it suffers from having many specific objects and limited recursion. For example, it is not generalized to model a virtual machine inside a virtual machine.

In accordance with the present technique, a more fundamental computing model is used to explicitly represent the three actions on the bit. This fundamental model is the Turing Machine. As is known in the art, the Turing Machine is a mathematical construct that all existing and future computer instances can be mapped to. The basic Turing Machine has an (infinite) tape on which are printed symbols, and a machine head that reads each incoming symbol from the tape, and writes symbols to the tape in accordance with a finite action table. In practical terms, the tape can be used to represent an input/output stream, and the machine head can be used to represent a processor or a finite state machine that operates on the input symbols in accordance with a program (which represents Turing's "action table"). Theoretical computer science uses Turing machines to study questions of what is computable (computability), and how difficult it is to compute something (complexity). One of the useful derivatives in this mathematic is the Universal Turing Machine (UTM) which accepts, as input, descriptions of Turing Machines and their input, and is able to execute them. Roughly speaking, this is taking in code (software) and data, and processing it. From its definition, it can be understood that the Universal Turing Machine (UTM) can recurse, that is, machines running on machines.

Recursion

Figure 6B:
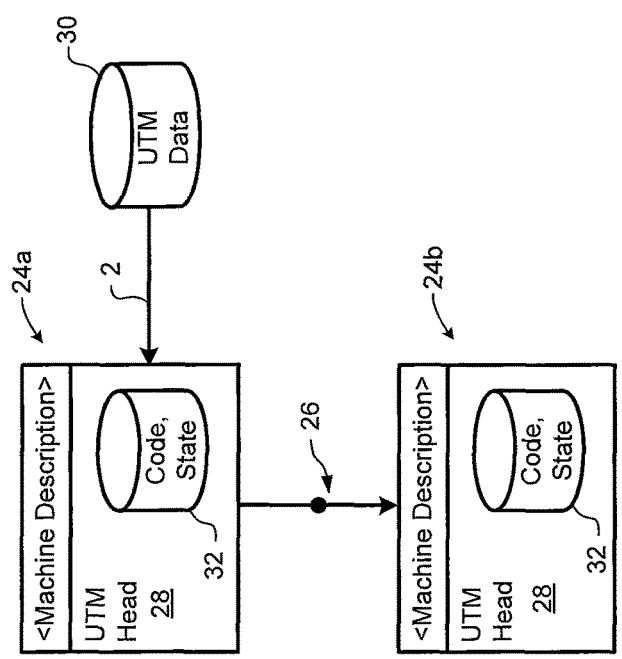
FIGS. 6A and 6B schematically illustrate Universal Turing Machine (UTM) recursion and modeling of compute functions in accordance with the present technique.
Figure 6A:
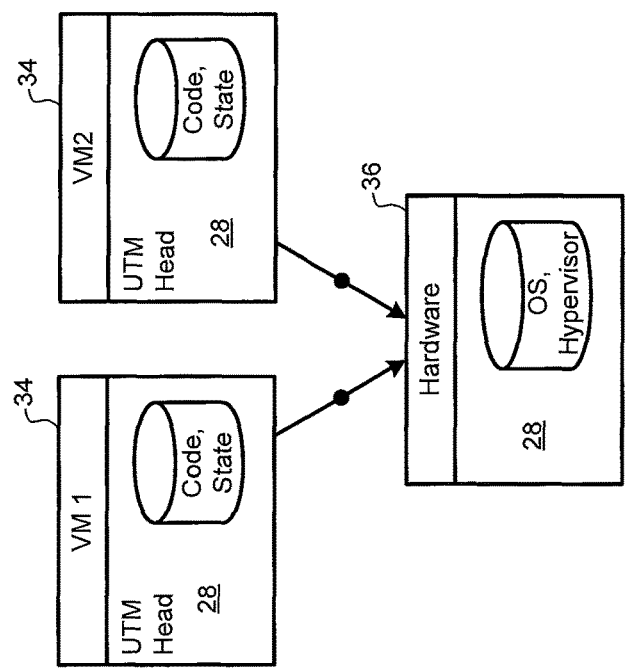

In accordance with the present technique, the UTM can be defined as a topological element in the model and the relationship between UTMs is something that needs to be expressed. FIG. 6 shows a representation of these topological components, using an example that comprises a pair of UTMs 24 connected by tape link 26. A UTM head 28 is the part of the Turing machine that reads input symbols (data) 30. The action table of the Turing machine is represented as a file of code or state 32 inside the machine 24 which is distinct from the information on the input tape 30 (UTM data) to the machine. The file 32 holds program code defining how to process input symbols, and state defining a current state of the UTM 24. To represent that a UTM runs inside another UTM, a topological "tape-link" element 26 may be used. FIG. 6A illustrates a case in which one UTM 24*a* is running in a second UTM 24*b*. FIG. 6B illustrates a case in which two Virtual Machines 34 (VMs) represented by respective UTMs are running on the same hardware processor 36 (which is also represented by a UTM). Storage is present in the UTMs 34 and 36 due to the presence of code and state within the respective UTM heads 24. Because this storage is internal to each UTM, it is distinct from storage used for input and output data.

Figure 7:
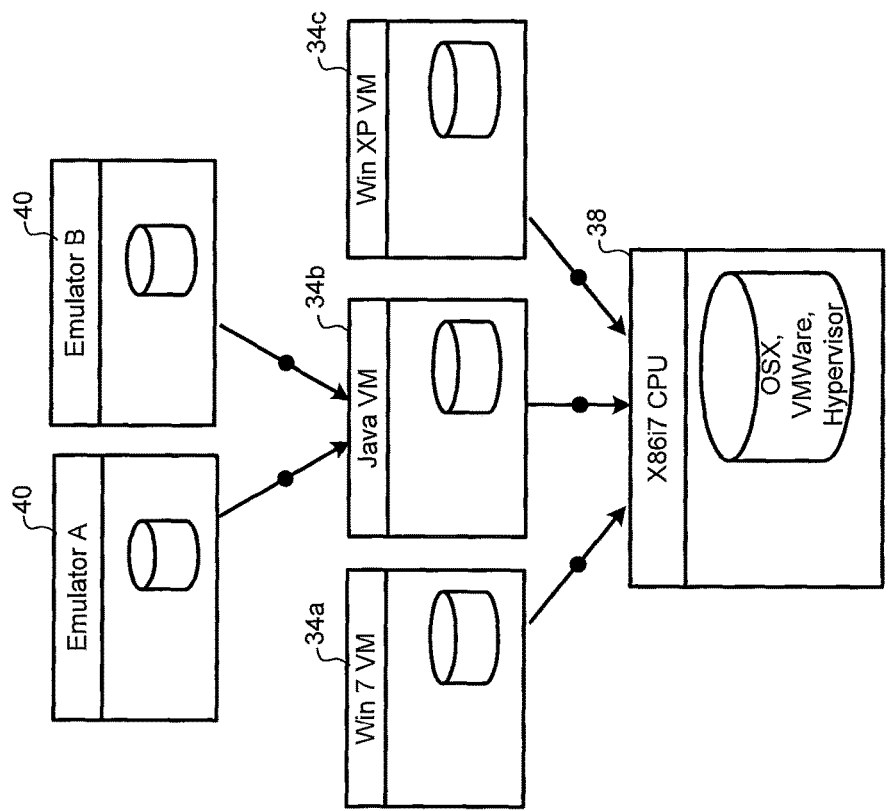
FIG. 7 schematically illustrates and example of machine recursion in accordance with the present technique.

Recursion in computing does occur but is usually not considered as such because most systems have very limited depth of recursion. This is primarily due to performance limitations as more (virtual) machines share a common CPU. FIG. 7 shows an example of recursion that is possible with current CPU technology. In the example of FIG. 7, an X86i7 CPU 38 is running three virtual machines 34*a-c*, one each for Win 7, Java and Win XP. The Java VM 34*b* is running two emulators 40.

Somewhat like inverse multiplexing in networking, it is possible for a UTM 24 to recurse to multiple UTMs. This occurs in multicore processors, for example. Most personal computers (PCs) today run multiple core CPUs, and an operating system has a role in enabling applications to use those cores.

Storage

As noted above, networking can be extensively involved when servers use networked storage. Even within computing systems, there is much bit transfer between computing machines, for example between a CPU and various devices (which are specialized machines) within a computer server. As illustrated in FIG. 6, data used by a machine may be represented as a file connected to a UTM via a link, which may be represented as a G.800 type link 2. In a PC, a more complete model might also show an adaptation function for adapting a file stored on a mass storage device (such as a hard disc) to the CI of the application running in the CPU.

Figure 8:
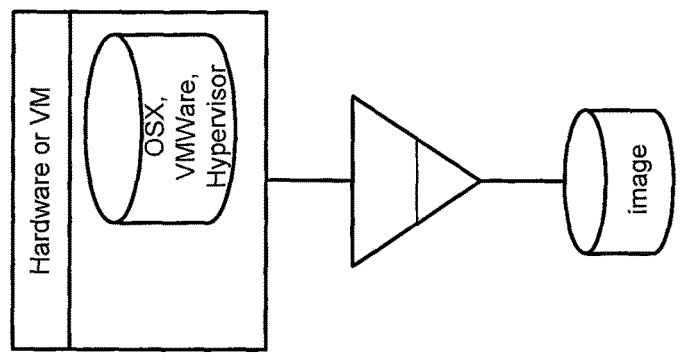
FIG. 8 schematically illustrates adaptation between a machine instance and storage in accordance with the present technique.

An equivalence exists in computing systems where a machine and all of its running state is stored to an image. This image can then be restored on the same or different machine, resulting in the machine either being returned to an earlier running state (in the case where the image is restored to the same machine) or "cloned" (in the case where the image in restored to a different machine). In the present technique, the function to do this is an adaptation function as described above with reference to FIGS. 4A and 4B, except that in this case the source and sink are a machine (UTM) and a file respectively. This model is illustrated in FIG. 8. Since an image is, in fact, a file, once it has been created, it can be moved over networks as described above with reference to FIG. 5. Moving virtual machines (VMs) between (bare metal) processors is an example of this process, and often an associated storage move is performed as well.

Another example involving storage is the case where Java code is downloaded, often in a Web interface, and executed in a Web browser as part of the function of a Web page.

Networking

Aside from the use of networking to move information to and from computing entities, it was noted above that the adaptation and termination functions in networking are themselves computing functions. That is, a UTM (or machine) could replace the adaptation/termination functions (and other G.800 processing functions, if desired) such as the G.800 layer processor. In actual networking systems, computing is used for some or all of the forwarding functions. This implies that the G.800 subnetwork transport entity also involves computing. Indeed when looking at a matrix (node), one view is that it is in fact a specialized computing machine that internally directs information.

The widespread existence of virtual routers (especially in Linux machines) illustrates that a single machine can provide the subnetwork transport entity for an IP router. Similarly, a Virtual Ethernet Bridge (VEB) provides Ethernet frame delivery between VMs running over the same hypervisor. This constitutes a G.800 subnetwork within a single machine. Two examples are shown in FIGS. 9A and 9B.

Figure 9B:
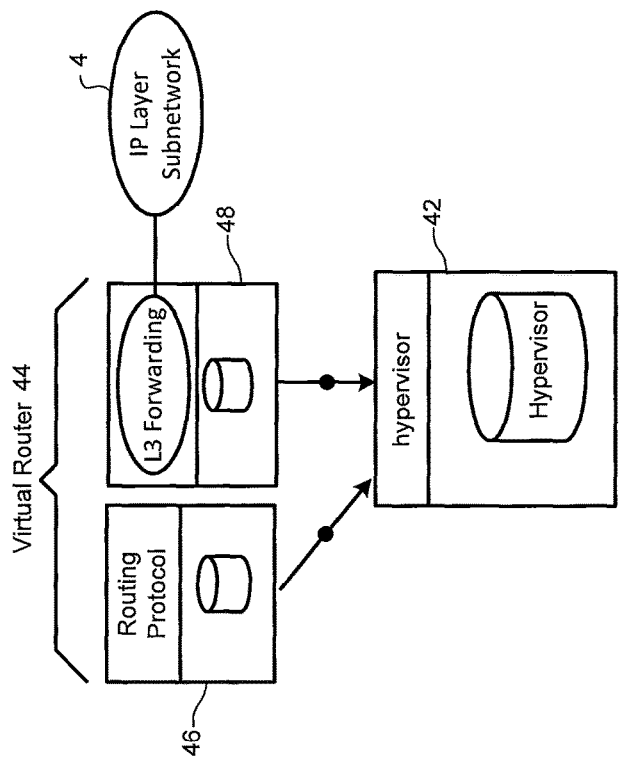
FIGS. 9A and 9B schematically illustrate Virtual Ethernet Bridging and Virtual Router functions in accordance with the present technique.
Figure 9A:
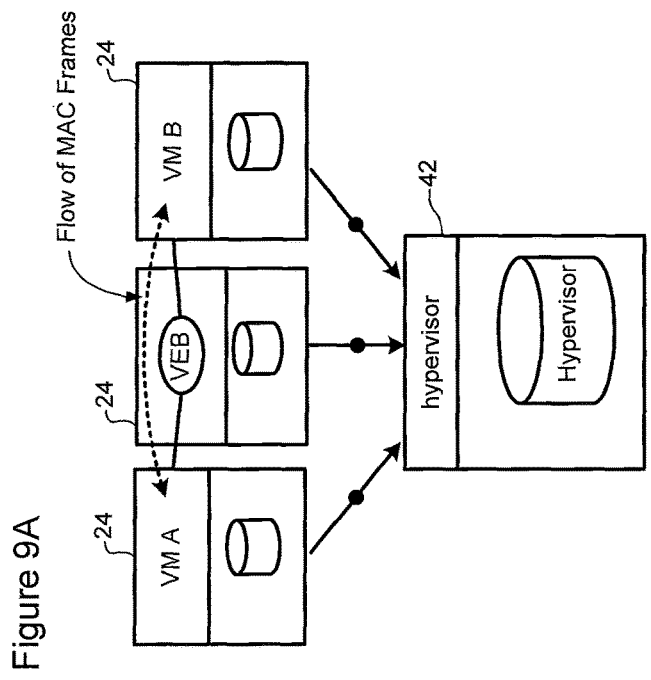

In the example of FIG. 9A, a Virtual Ethernet Bridge (VEB) provides Ethernet frame delivery between a pair of Virtual Machines (VM A and VM B). The VEB and both VMs are represented as respective UTMs 24 running on a common UTM configured as a Hypervisor 42.

In the example of FIG. 9B, a Virtual Router 44 is configured using a Routing Protocol UTM 46 and a Layer-3 (L3) Forwarding UTM 48 running on a hypervisor UTM 42. The Routing Protocol application (executed by the Routing Protocol UTM 46) calculates forwarding rules that are used by the L3 Forwarding function implemented by the L3

Forwarding UTM 48, which is connected to an IP layer subnetwork 4, and serves as a source/sink for CI of that subnetwork.

In FIGS. 9A and 9B, the G.800 subnetwork symbol is used to explicitly describe the L3 forwarding machine function being performed by the respective UTM 48. Recursion of subnetworks in G.800 can then extend beyond a matrix to a machine, or a matrix/node can just be considered a machine. Hence, the computer is the network. This result is not surprising as complex systems commonly have multiple viewpoints. From the view point of networking, subnetworks are an organization of access points between which information can be transferred. From the view point of computing, the subnetwork is part of a single virtual machine and is used to link its constituent processors together. We then restate the observation that at some level of subnetwork recursion, an equivalence exists between subnetworks and computing machines.

Another computing view is that a subnetwork connects multiple machines together. However, this is just a recursion of computing at the same layer. At a macro level (esp. grid computing and supercomputing), a network ties together the individual computers (servers) that comprise a larger computer. The World Wide Web is an important example of enabling multiple computers to behave as a single computer. At the micro level, a PC motherboard has a network (of buses) that connect multiple computers and components together so that they can operate (and be viewed) as single machine.

Examples of the Triple Unified Architecture

Figure 10:
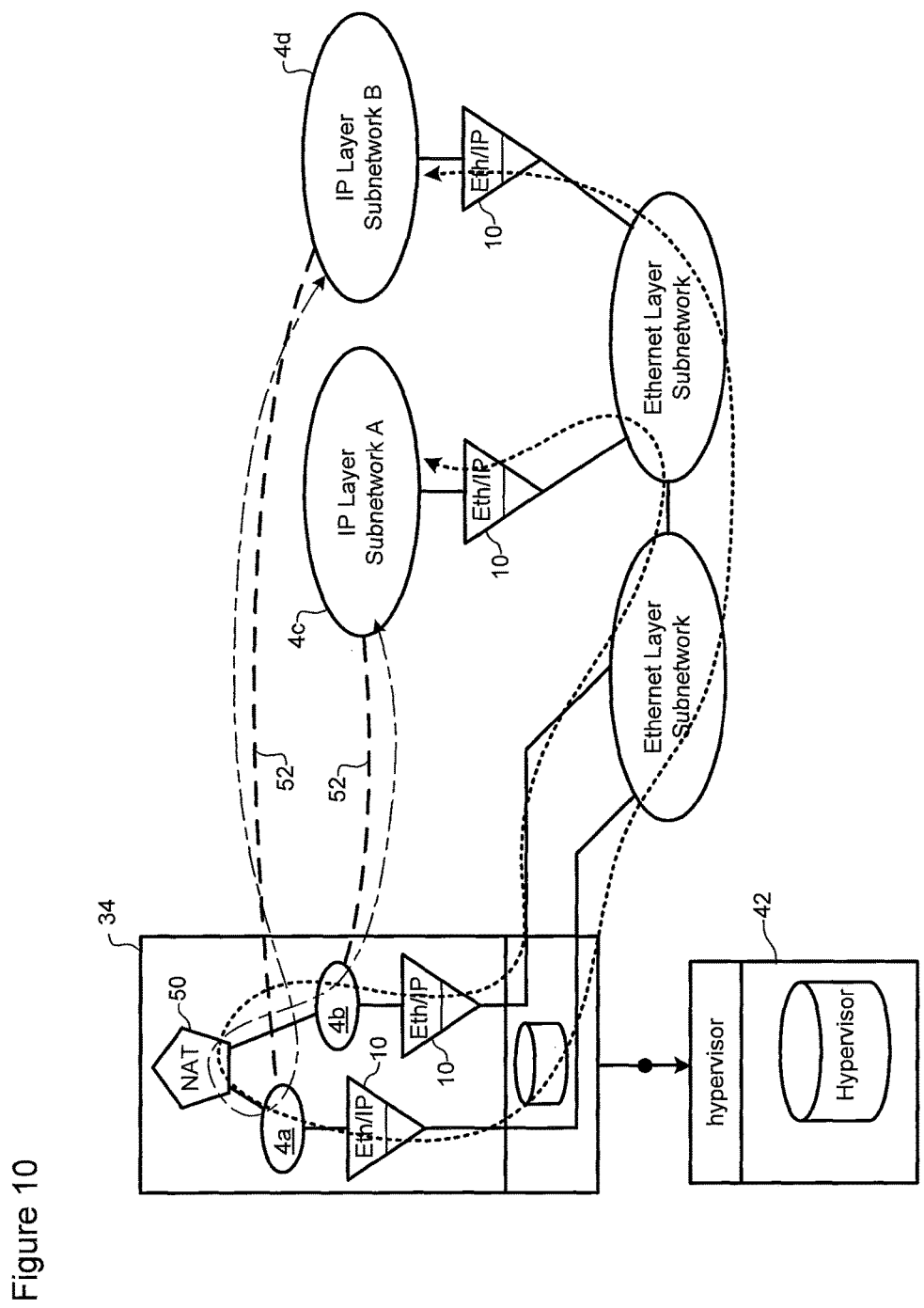
FIG. 10 schematically illustrates an example of Network Address Translation in accordance with the present technique.

A more complex example is presented in FIG. 10 that illustrates the known Network Address Translation (NAT) function in IP implemented in a virtual machine in accordance with the present technique. As may be seen in FIG. 10, the NAT function is represented as a NAT virtual machine 34 running on a hypervisor 42. Within the NAT VM 34, there are two IP subnetworks 4a and 4b that each contain an IP forwarding table. The two subnetworks differ from each other in that they implement different IP address plane instances. The NAT function 50 represents a G.800 layer processor function that does not alter the CI (IP packets) of the information going through it, but rather modifies the addresses of IP packets traversing the NAT VM 34 between the two IP subnetworks 4a and 4b. Ethernet/IP Adaptations 10 between each IP subnetworks 4a and 4b and respective Ethernet ports are also provided within the NAT VM 34, as these are commonly found in data centre servers. FIG. 10 shows links 52 from the IP subnetworks 4a and 4b in the NAT VM 34 to respective external IP subnetworks 54. The IP links 52 are actually carried in an Ethernet server layer, whose frames enter the NAT VM 34 via a real network interface card (NIC—not shown) associated with the bare metal processor (not shown) of the hypervisor 42.

Figure 11:
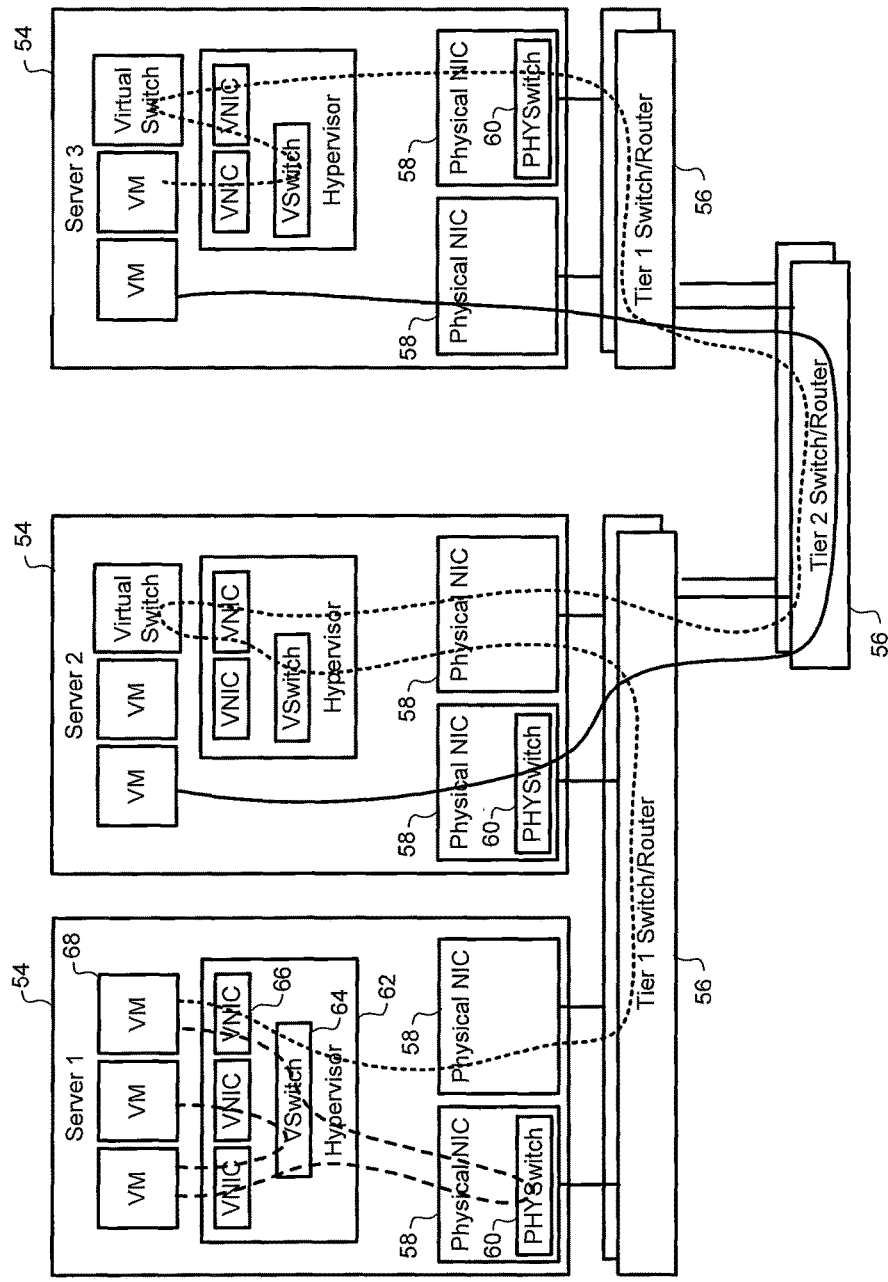
FIG. 11 schematically illustrates networking functions represented using methods known from Network Functions Virtualization Industry Specification Group (NFV ISR)

The Network Functions Virtualization Industry Specification Group (NFV ISG) is developing a concept to move network functions that reside on specific hardware into virtual appliances running on commodity servers, storage, and Ethernet switches. They define a Virtualized Network Function (VNF) to be "a network function that has been virtualized and can be offered as a network service or be part of a service comprised of a set of virtualized network functions and/or non-virtualized network functions.". Examples of VNFs include load balancers, virtual routers, and NAT boxes. An example of the information flows present between VNFs described in one of the NFV ISG architecture documents is shown in FIG. 11. In the architecture of FIG. 11, three servers 54 are connected via connections through Tier 1 and Tier 2 switch/router instances 56. Each server 54 is connected to one or more switch/router instances 56 via physical NICs 58, each of which includes a respective physical switch 60. Within each server, a hypervisor 62 implements a vSwitch 64 which interfaces with one or more virtual NICs (VNICs) 66. Each VNIC 66 provides an L2 interface to a respective virtual machine 68. In the arrangement of FIG. 11, each Switch/Router instance 56 is an Ethernet subnetwork, and consequently each vSwitch 64 is provided as a Virtual Ethernet Bridge (VEB). The VMs 68 can be configured to implement a variety of different functions. In the arrangement of FIG. 11, two of the VMs are identified as "Virtual Switches" which are configured as IP routers. With this arrangement, IP packets can be routed from Server 1 to Server 3 (following the path shown in dotted line), via an IP router VM in Server 2, and with appropriate Ethernet/IP adaptation provided at in each VNIC 66 traversed by the IP packets.

Figure 12:
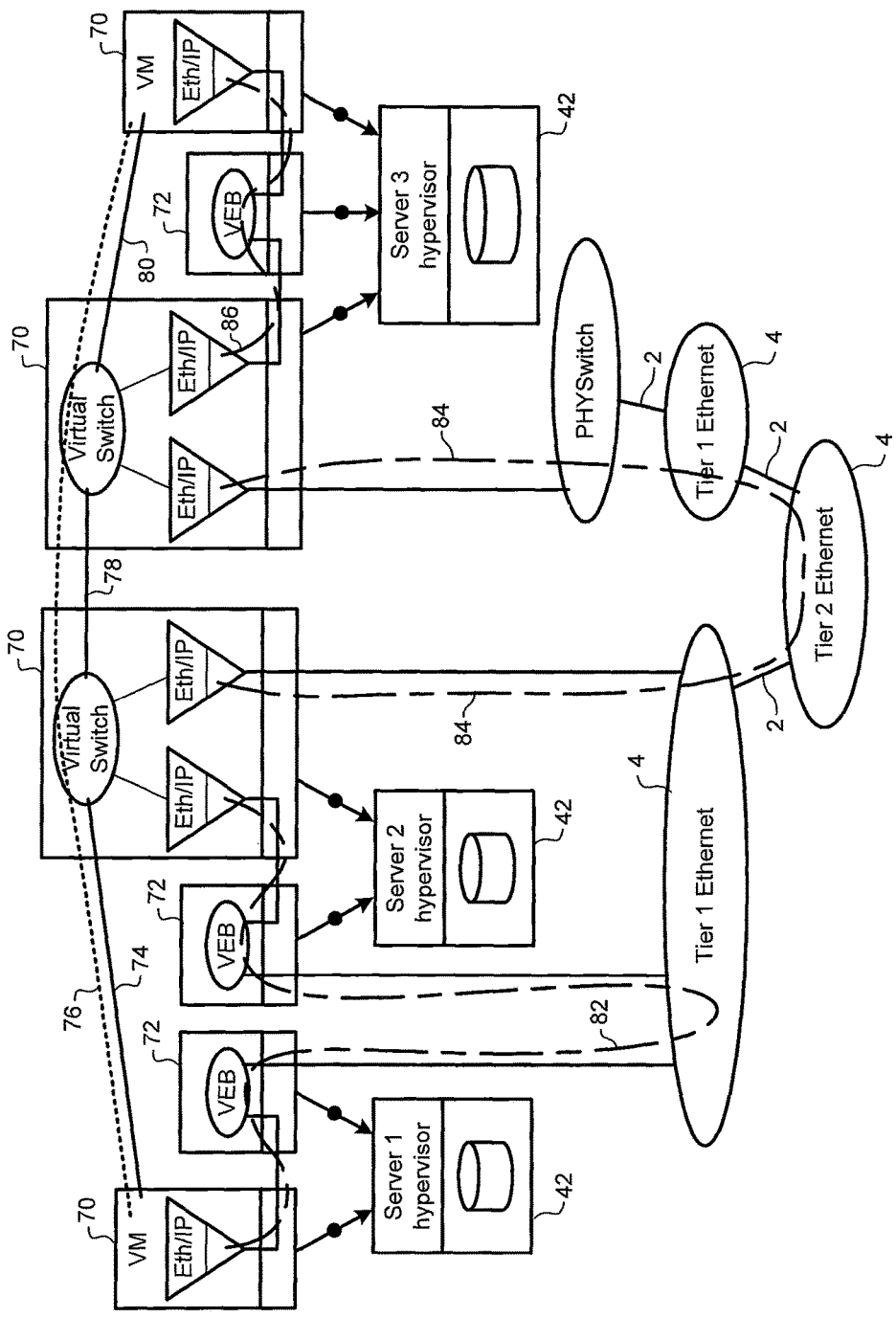
FIG. 12 schematically illustrates the networking functions of FIG. 11 represented using methods in accordance with the present technique.

Applying the architectural extensions in accordance with the present techniques, this same information flow can be modelled as shown in FIG. 12. In FIG. 12, each server 54 is represented by a respective hypervisor 42, which runs an IP virtual machine 70 and a VEB virtual machine 72. The physical NICs 58 (FIG. 11) are located in the Ethernet layer, as are the vSwitches 64 (which are represented by the VEB VMs 72 in FIG. 12). Each of the IP VMs 70 include respective IP applications (only two are shown in FIG. 12), two of which are IP routers. IP application layer links 74, 78, and 80 can then be used for forwarding of IP packet flows 76 in the IP layer. Actual transport of IP packets is supported by an Ethernet server layer comprising three Ethernet subnetworks 4 interconnected by links 2, with appropriate Ethernet/IP adaptation associated with each IP VM 70. IP link 74 is implemented by an Ethernet connection 82 (or flow). Similarly link 78 and 80 are over Ethernet connections 84 and 86. The example illustrates the computing extension to the G.800 model and the case of the subnetwork within a VM.

In the foregoing description, embodiments are described in which the ITU-T Rec. G.800 model is used as a basis for representing networking entities such as connections, subnetworks, and switches. However, it will be appreciated that the present technique is not limited to G.800 networking architectures. Rather, any suitable hierarchical architecture of networking (bit transport) entities may be used in conjunction with the present technique. Similarly, it will be appreciated that the present technique may be implemented using any suitable hierarchical architecture for modelling computing (bit transformation) and storage functions. As such, it will be understood that the present technique is not limited to any specific protocols, conventions or standards.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention can also be stored on the machine-readable medium. Software running from the machine-readable medium can interface with circuitry to perform the described tasks.

So-called "model-view controller" systems and software are known in the art for displaying, analysing and managing a model pattern that represents a complex system such as a database or computing network. In some cases, embodiments of the invention can include the model pattern of a model-view controller system, and/or a model-view controller system that uses a model pattern designed in accordance with the present invention.

The embodiments of the invention described herein are intended to be illustrative only. The scope of the invention is therefore intended to be limited solely by the scope of the appended claims.

We claim:

1. A method of managing a computing network, the method comprising:
    representing at least a portion of the computing network as a recursive architecture of elements representing bit transport, bit transformation and bit storage actions of the network, wherein the recursive architecture models elements in the computing network to abstract the actions therein in an information model that models the bit transport, bit transformation and bit storage actions of different network elements in the computing network recursively as data objects in a unified manner to represent networking, computing and storage actions together in the information model, and wherein the recursive architecture models the bit transport actions within a layer via subnetworks and links and between layers via adaptation and termination functions for bit transport and via a Universal Turing Machine which models bit transformation for the computing action as an input, an action on the input, and an output;
    associating a respective set of one or more elements with at least one system implementing functions of the portion of the computing network; and
    using the information model of the recursive architecture of elements to manage the at least one system implementing functions of the portion of the computing network,
    wherein the information model is based on ITU-T Recommendation G.800 and the management of the computing and storage actions is provided via the information model along with the management of the networking actions.

2. The method as claimed in claim 1, wherein the recursive architecture of elements comprises any one or more of:
    a computing entity representing a respective bit transformation action of the computing network;
    a networking entity representing a respective bit transfer function of the computing network; and
    a file entity representing a respective bit storage function of the computing network.

3. The method as claimed in claim 2, wherein the recursive architecture comprises a recursive architecture of layers and inter-layer links, each layer including one or more elements configured to use a respective information type, and each inter-layer link defining a client-server relationship between a respective pair of adjacent layers.

4. The method as claimed in claim 3, wherein each inter-layer link includes a respective computing entity configured to implement adaptation between a client information type of a client layer and a server information type of a server layer.

5. The method as claimed in claim 3, wherein the information type comprises at least a predetermined format of data, the predetermined format being selected in accordance with at least one of:
    networking entities of a respective layer; and
    computing entities of a respective layer.

6. The method as claimed in claim 2, wherein the computing entity comprises any one or more of:
    a Universal Turing Machine configured to implement an application defining the respective computing function; and
    a tape link connecting a first Universal Turing Machine to a second Universal Turing Machine, the tape link representing that the first Universal Turing Machine is running within, or at least partially executed by, the second Universal Turing Machine.

7. The method as claimed in claim 6, wherein the respective computing function comprises any one or more of:
    adaptation between a first information type and a second information type;
    routing between an input port and an output port; and
    transformation of first data of a first information type into second data of the first information type.

8. A computing network management system, the system comprising at least one processor executing software instructions implementing the steps of:
    representing at least a portion of the computing network as a recursive architecture of elements, the recursive architecture of elements representing bit transport, bit transformation and bit storage actions of the network, wherein the recursive architecture models elements in the computing network to abstract the actions therein in an information model that models the bit transport, bit transformation and bit storage actions of different network elements in the computing network recursively as data objects in a unified manner to represent networking, computing and storage actions together in the information model, and wherein the recursive architecture models the bit transport actions within a layer via subnetworks and links and between layers via adaptation and termination functions for bit transport and via a Universal Turing Machine which models bit transformation for the computing action as an input, an action on the input, and an output;
    associating a respective set of one or more elements with at least one system implementing functions of the portion of the computing network; and
    using the information model of the recursive architecture of elements to manage the at least one system implementing functions of the portion of the computing network,
    wherein the information model is based on ITU-T Recommendation G.800 and the management of the computing and storage actions is provided via the information model along with the management of the networking actions.

9. The system as claimed in claim 8, wherein the recursive architecture of elements comprises any one or more of:
    a computing entity representing a respective bit transformation action of the computing network;
    a networking entity representing a respective bit transfer function of the computing network; and
    a file entity representing a respective bit storage function of the computing network.

10. The system as claimed in claim 9, wherein the recursive architecture comprises a recursive architecture of layers and inter-layer links, each layer including one or more elements configured to use a respective information type, and each inter-layer link defining a client-server relationship between a respective pair of adjacent layers.

11. The system as claimed in claim 10, wherein each inter-layer link includes a respective computing entity configured to implement adaptation between a client information type of a client layer and a server information type of a server layer.

12. The system as claimed in claim 10 wherein the information type comprises at least a predetermined format of data, the predetermined format being selected in accordance with at least one of:
   networking entities of a respective layer;
   computing entities of a respective layer; and
   storage entities of a respective layer.

13. The system as claimed in claim 9, wherein the computing entity comprises any one or more of:
   a Universal Turing Machine configured to implement an application defining the respective computing function; and
   a tape link connecting a first Universal Turing Machine to a second Universal Turing Machine, the tape link representing that the first Universal Turing Machine is running within, or at least partially executed by, the second Universal Turing Machine.

14. The system as claimed in claim 13, wherein the respective computing function comprises any one or more of:
   adaptation between a first information type and a second information type;
   routing between an input port and an output port; and
   transformation of first data of a first information type into second data of the first information type.

15. A non-transitory computer readable storage medium storing software instructions for controlling at least one computer to implement a model-view controller system comprising a model of a computing network, the model including:
   a recursive architecture of elements representing at least a portion of the computing network, the recursive architecture of elements representing bit transport, bit transformation and bit storage actions of the network, wherein the recursive architecture models elements in the computing network to abstract the actions therein in an information model that models the bit transport, bit transformation and bit storage actions of different network elements in the computing network recursively as data objects in a unified manner to represent networking, computing and storage actions together in the information model, and wherein the recursive architecture models the bit transport actions within a layer via subnetworks and links and between layers via adaptation and termination functions for bit transport and via a Universal Turing Machine which models bit transformation for the computing action as an input, an action on the input, and an output; and
   an association between a respective set of one or more elements in the information model with at least one system implementing functions of the computing network and using the information model for management of the functions,
   wherein the information model is based on ITU-T Recommendation G.800 and the management of the computing and storage actions is provided via the information model along with the management of the networking actions.

16. The method as claimed in claim 1, wherein the information model abstracts relationships of the elements comprising any of networking elements, computing elements, and storage elements based on the actions.

* * * * *